United States Patent
Omae et al.

(10) Patent No.: US 6,338,919 B1
(45) Date of Patent: Jan. 15, 2002

(54) ELECTRODE PLATE FOR LEAD-ACID BATTERY

(75) Inventors: Takao Omae; Akira Kamada; Masashi Watanabe, all of Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 09/488,639

(22) Filed: Jan. 21, 2000

(30) Foreign Application Priority Data

Jan. 21, 1999 (JP) .......................................... 11-013564
Apr. 28, 1999 (JP) .......................................... 11-121052
Jul. 14, 1999 (JP) .......................................... 11-199898

(51) Int. Cl.$^7$ ................................................ H01M 4/74
(52) U.S. Cl. .............................. 429/242; 429/241; 29/2
(58) Field of Search ........................... 429/242, 241; 29/2; H01M 4/74

(56) References Cited

U.S. PATENT DOCUMENTS

| 4,271,586 A | 6/1981 | McCartney, Jr. ............ 29/623.5 |
| 5,762,654 A | 6/1998 | Kump et al. ................ 29/623.5 |

FOREIGN PATENT DOCUMENTS

| EP | 0 682 378 A1 | 11/1995 | ............ H01M/7/74 |
| JP | 58-18875 | 2/1983 | ............ H01M/4/73 |
| JP | 58-133271 | 9/1983 | ............ H01M/4/73 |
| JP | 60-185365 | 9/1985 | ............ H01M/4/82 |
| JP | 2-267864 | 11/1990 | ............ H01M/4/73 |

*Primary Examiner*—John S. Maples
(74) *Attorney, Agent, or Firm*—Sughrue Mion, PLLC

(57) ABSTRACT

A lead-acid battery electrode plate is manufactured by consecutively supplying a lead or lead alloy sheet; leaving a part in the vicinity of the center of the sheet as a non-expansion portion and expanding both sides like mesh to form a grid body; filling active material paste into the grid body; and cutting the grid body to predetermined dimensions. In the lead-acid battery electrode plate, the non-expansion portion forms a current collector part of the electrode plate along an expansion portion in an up and down direction of the electrode plate. One or more openings are made in a part of the non-expansion portion. A part of the non-expansion portion is projected above the position of an upper margin of the cut expansion portion as a current collector lug part. When the current collector lug part is placed upside, the expansion direction is the width direction of the electrode plate.

2 Claims, 7 Drawing Sheets

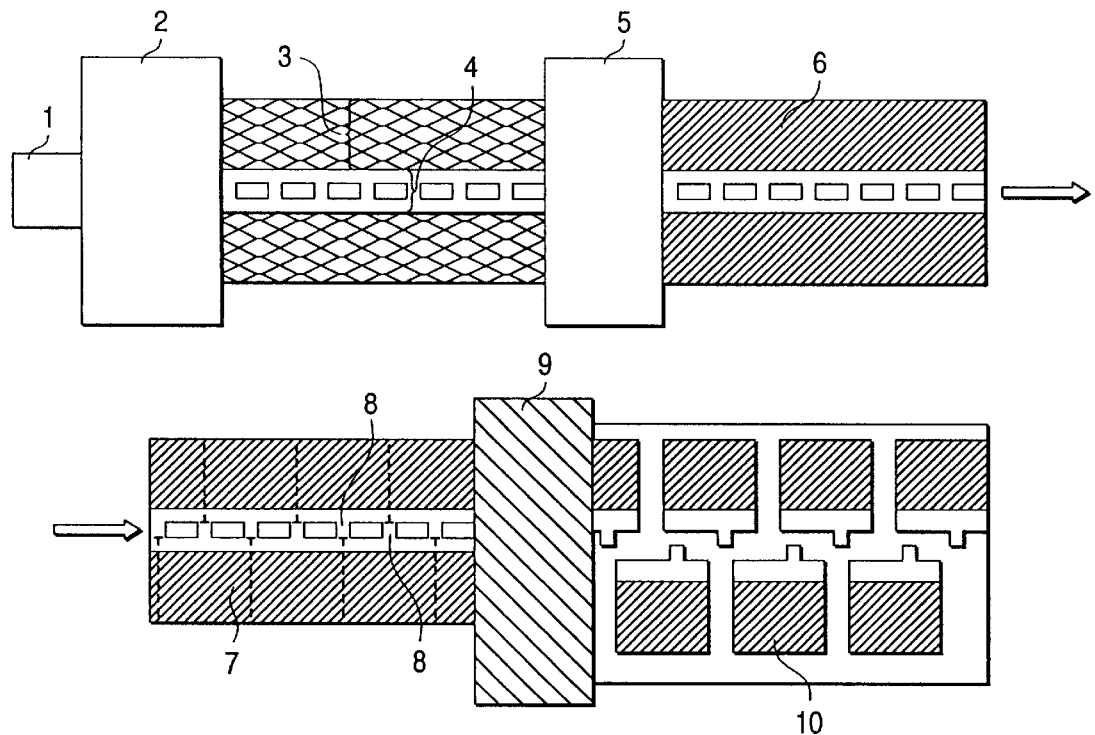
FIG. 1 PRIOR ART
PRIOR ART
FIG. 2
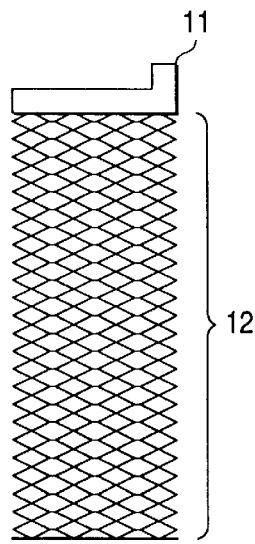
PRIOR ART
FIG. 3
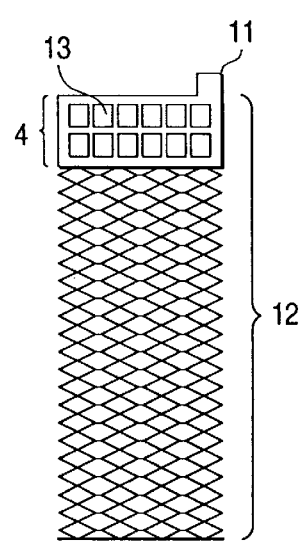
PRIOR ART
FIG. 4
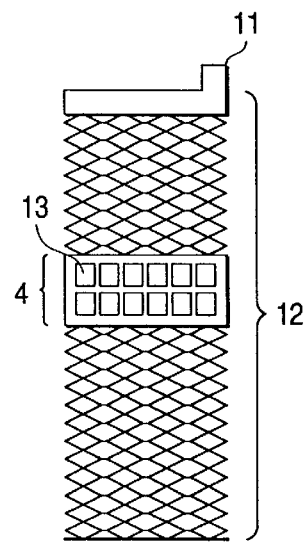

PRIOR ART
FIG. 5
PRIOR ART
FIG. 6
PRIOR ART
FIG. 7
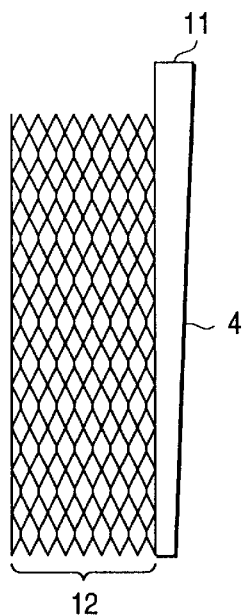
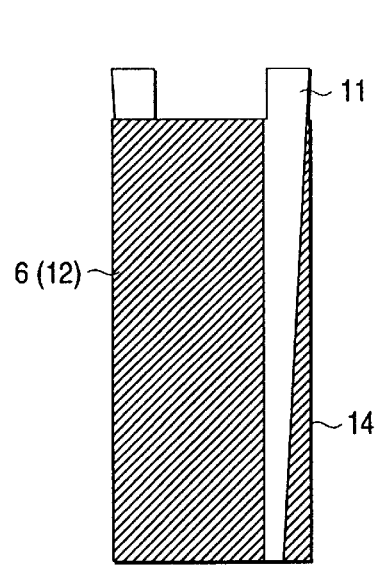
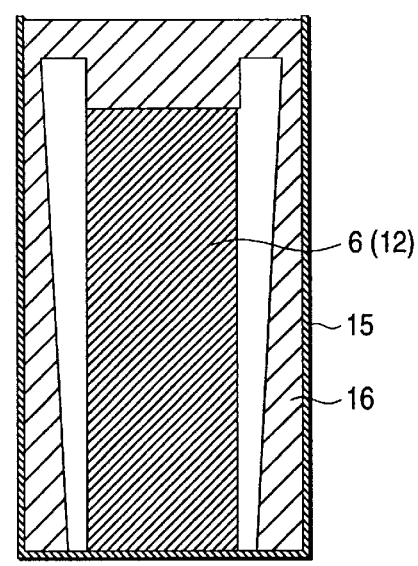
PRIOR ART
FIG. 8
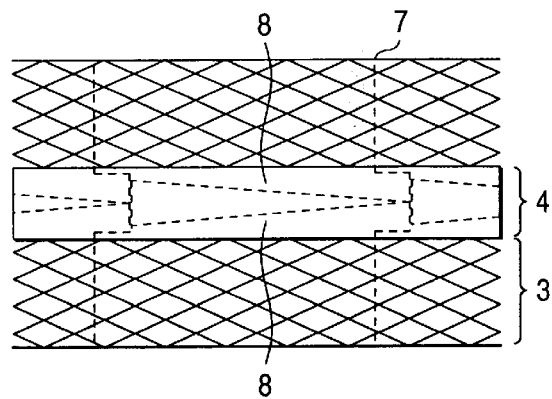

ELECTRODE PLATE FOR LEAD-ACID BATTERY

BACKGROUND OF THE INVENTION

1. Field of the Invention

This invention relates to an expanded grid body mainly used with a large-sized lead-acid battery and a manufacturing method of an electrode plate using the expanded grid body.

2. Description of the Related Art

As a manufacturing method of pasted-type lead-acid battery electrode plate, for example, there is the following manner as shown in FIG. 1. That is, a lead or lead alloy sheet 1 is expanded like mesh by an expanding machine 2. A current collector lug part (simply referred lug part) 8 is formed in a non-expansion portion 4. A grid body which is an expansion portion 3 is filled with an active material paste. Thereafter, the grid body is cut by a cutter 9 to separate electrode plates of a predetermined size. This method is high in productivity and so-called expanded electrode plates manufactured by the method are uniform and the mass of the grid body relative to the active material can be decreased, so that weight reduction is possible.

Hereinafter, the width and the height of the grid body or electrode plate will refer to directions when the grid body or electrode plate is placed with the lug part upside.

An electrode plate of a large-capacity lead-acid battery used as a backup power source of telecommunication, etc., or an emergency power source is sized about 150 mm in the width direction, but about 250 to 500 mm in the height direction with a non-expansion portion left as shown in FIG. 2, the expanded portion grows and thus the following disadvantages are included:

Since the height of the expanded portion becomes large, the manufacturing devices are upsized;

handling at the assembling time becomes difficult to perform (warpage, deformation of electrode plate because of insufficient strength); and voltage drop in the expansion portion becomes remarkably large and poor discharge performance results.

As a method of overcoming these disadvantages, a method of increasing a non-expansion portion 4 in the upper part of a grid body and providing an opening 13 in the increased part (JP-U-58-133271) as shown in FIG. 3, and a method of leaving a non-expansion portion 4 both in margins and in the center and providing an opening 13 in the center (JP-A-2-267864, FIG. 4) have been proposed. However, improvement in the discharge performance is insufficient for a large-sized electrode plate of which is large in the height direction as compared with the width direction. Then, several expanded electrode plates (grid bodies), each expanded in the grid body width direction with a non-expansion portion left in the grid body height direction were proposed in the past (for example, JP-A-54-177525, JP-B-59-51107, JP-B-61-8540, and JP Patent No. 2765020).

Since an electric current flowing into an electrode plate also becomes large in a large battery, it is necessary to widen the lug part width to some extent. However, if the lug part and the non-expansion portion following the lug part are set to the same width, the grid body mass is increased and the active material holding (filling) amount is decreased. Then, in the expanded electrode plates which are expanded in the grid body width direction, the width of the non-expansion portion 4 following a lug part 11 is made narrower than the width of the lug part 11 as shown in FIG. 5. However, the lug part 11 of the grid body of this shape extends off an active material fill part 12 to one side. Thus, as shown in FIG. 6, if an electrode plate using the grid body of this shape is superimposed on an electrode plate different in polarity to manufacture a battery, a portion 14 not overlapping the adjacent electrode plate occurs and the efficiency of active material availability decreases, leading to capacity shortage of the battery. Particularly, in a valve regulated sealed lead-acid battery using a fine glass fiber separator, it is known that a battery with a compression degree of the electrode plate and the separator is inferior in life performance, and there is a possibility that capacity lowering at an early stage will occur because of shortage of the pressure degree in the portion not overlapping the adjacent electrode plate. On the other hand, as shown in FIG. 7, if the electrode plates are placed one upon another so as to completely superpose the active material fill portion 12, current collector lug parts 11 project to a side, thus a battery container 15 must be designated large, resulting in lowering of the volume energy density. Further, a grid body extends in a gap 16 between the electrode plate and the battery container 15, whereby adhesion properties of the grid members with active material worsen, leading to lowering of the battery capacity.

To furthermore improve current collection performance and decrease scrap loss, a mesh part is provided on both sides of a non-expansion portion in JP-B-61-8545. However, if a decrease in the scrap loss is given a high priority, an increase in the grid body mass and battery capacity shortage caused by decrease of the active material filling amount introduce a problem.

To provide an active material mass in the expanded grid body expanded in the grid body width direction, an active material may also be filled into a non-expansion portion. As shown in FIG. 1, to fill an active material into the expanded grid body of the conventional shape, the active material is prevented from being deposited on current collection lug parts 8, because welding becomes extremely difficult to perform if an active material is deposited on electrode plate lug parts when the electrode plate of the same polarity lug parts are welded at the battery assembling process. However, as shown in FIG. 8, in the expanded electrode plate expanded in the grid body width direction, to consecutively fill an active material also into non-expansion portion 4 in a concatenation state of grid body like a belt, the active material is also deposited on the lug parts because the electrode plate lug parts 8 are positioned on the same line as the fill part with respect to the grid body travel direction. To circumvent this problem, it is also possible that the direction is changed after cut to separate grid body forms and that the grid body is passed through a pasting machine with the grid body set perpendicular to the travel direction, but uniformity of filling and the productivity of electrode plates are degraded.

In fact, the expanded grid bodies expanded in the width direction are scarcely used because of the problems.

SUMMARY OF THE INVENTION

It is therefore an object of the invention to provide a grid body form that can be intended for reducing the weight of an electrode plate and enhancing the productivity of the electrode plate and a manufacturing method of an electrode plate using the grid body form without degrading battery performance to apply an expanded electrode plate to a large-sized lead-acid battery.

According to the present invention, a lead-acid battery electrode plate manufactured by a process comprises the steps of: (1) consecutively supplying a lead or lead alloy sheet; (2) leaving a part in the vicinity of the center of the sheet as a non-expansion portion and expanding both sides like mesh to form a grid body; (3) filling active material paste into the grid body; and (4) cutting the grid body to predetermined dimensions; wherein the non-expansion portion forms a current collector part of the electrode plate along an expansion portion in an up and down direction of the electrode plate; one or more openings are made in a part of the non-expansion portion; a part of the non-expansion portion is projected above the position of an upper margin of the cut expansion portion as a current collector lug part; and when the current collector lug part is placed upside, the expansion direction is the width direction of the electrode plate.

According to the present invention, a manufacturing method of a lead-acid battery electrode plate comprises the steps of: consecutively supplying a lead or lead alloy sheet; leaving a part in the vicinity of the center of the sheet as a non-expansion portion and expanding both sides like mesh to form a grid body, so that the non-expansion portion forms a current collector part of the electrode plate along an expansion portion in an up and down direction of the electrode plate; making one or more openings in a part of the non-expansion portion; filling active material paste into the grid body; and cutting the grid body to predetermined dimensions; wherein a part of the non-expansion portion is projected above the position of an upper margin of the cut expansion portion as a current collector lug part; and when the current collector lug part is placed upside, the expansion direction is the width direction of the electrode plate.

According to the invention, the electrode plate using the expanded grid body excellent in discharge performance and productivity can be provided particularly as a large-sized lead-acid battery electrode plate.

BRIEF DESCRIPTION OF THE DRAWINGS

In the accompanying drawings:

FIG. 1 is a schematic drawing to show a manufacturing method of a conventional expanded grid body and an electrode plate using the grid body;

FIGS. 2 to 5 are drawings to show conventional examples of large-sized expanded grid bodies;

FIGS. 6 and 7 are drawings to show combination examples of electrode plates using conventional large-sized expanded grid body expanded in the grid body width direction;

FIG. 8 is a drawing to show an example of taking out a grid body expanded in the width direction from an expanded sheet;

PREFERRED EMBODIMENTS OF THE INVENTION

Preferred embodiments of the present invention will be discussed, but it is understood that the present invention is not limited to the embodiments.

Figure 9:
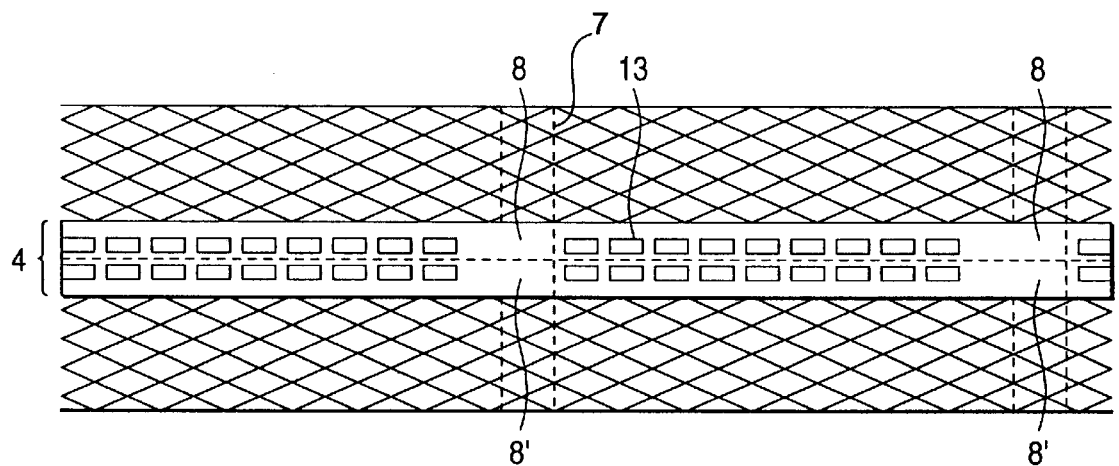
FIG. 9 is a drawing to show the form of a grid body of the invention before filling and cutting.
Figure 10:
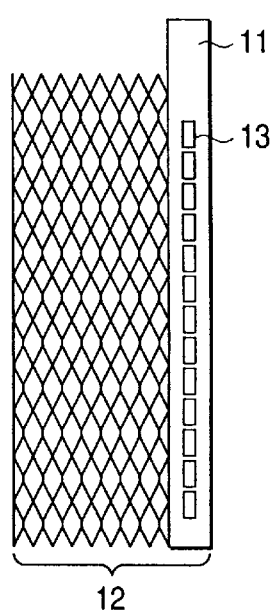
FIG. 10 is a drawing to show the form of the grid body of the invention after cutting.

First embodiment:

A sheet 2.0 mm thick manufactured by rolling a lead-calcium-tin alloy was consecutively expanded with a non-expansion port 4 left in the center as shown in FIG. 9. Subsequently, the non-expansion portion 4 of the expanded sheet was formed with openings 13 intermittently and a part of the expansion portion was cut at a position indicated by a dotted line 7, whereby a current collector lug part 8 was formed and an expanded grid body of the present invention (grid height H except lug part=400 mm, grid width W=140 mm) as shown in FIG. 10 was manufactured. The openings were made by stamping about 45% of the non-expansion portion when electrode plates were separated. Considering the electrical conductivity, the strength, the active material mass, and the mass of each electrode plate, a proper percentage of the openings is 30% to 70% to the non-expansion portion per electrode plate. This time, each opening was made rectangular, but the shape may be changed as desired depending on a consideration similar to the percentage of the openings described above.

As in the embodiment, the expansion portion is stamped, whereby the stamp chippings can be minimized and the lug part width can also be maximaized.

Figure 11:
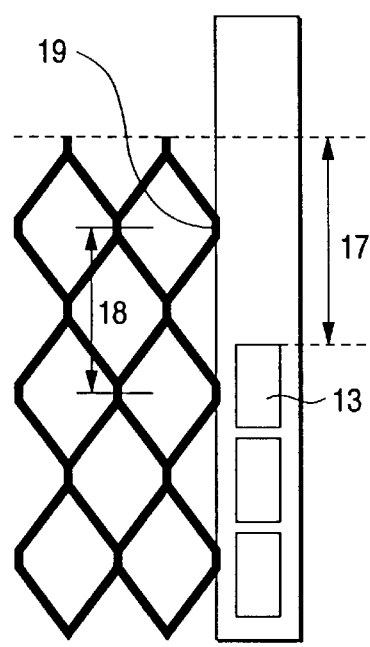
FIG. 11 is an enlarged schematic drawing to show the grid body of the invention.

If high-rate discharge is executed with a battery using the grid body, it is estimated that current will concentrate on the part just below the lug part 11. Thus, as shown in FIG. 11, a distance 17 from the lug part (grid body shoulder, expansion part upper end) to the first opening was set to 1.1 times a mesh major axis dimension 18 of the expansion portion and no opening existed at the side of a top intersection point 19 of mesh intersection points in contact with the non-expansion portion.

Figure 12:
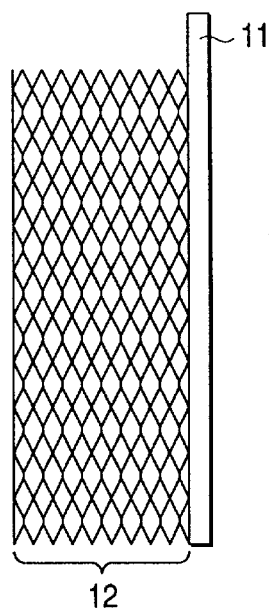
FIG. 12 is a drawing to show an example of a conventional large-sized expanded grid body.
Figure 13:
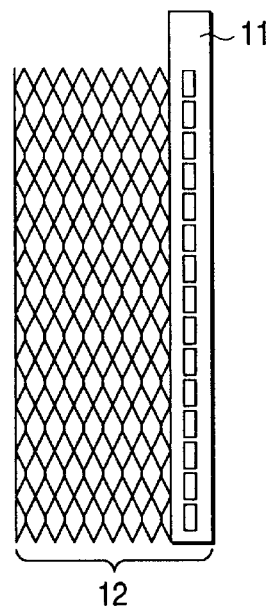
FIG. 13 is a drawing to show a comparison example of an expanded grid body of the invention.

To make a comparison, expanded grid bodies having the same grid body mass, the same grid body height except the lug part, and the same (maximum) width as shown in FIGS. 2 to 5, 12 and 13 were manufactured from the same rolled sheet. FIG. 2 shows a grid body in the related art expanded in the grid body height direction; the grid body is matched with the grid body of the invention in mass by changing the cut width at the expanding process. FIG. 3 shows a grid body expanded in the grid body height direction with a non-expansion portion provided in an upper part of the grid body and formed with openings. FIG. 4 shows a grid body expanded in the grid body height direction with a non-expansion portion provided in an intermediate part of the grid body and formed with openings. FIG. 5 shows a grid body expanded in the grid body width direction with the gradually lessened width of a non-expansion portion following a lug part. FIG. 12 shows a grid body having the same mass as the grid body of the invention with no openings made in a non-expansion portion, a wide expansion portion, and the non-expansion portion having a small width compared with the invention grid body. FIG. 13 shows a grid body having the same outside shape as the grid body of the invention with openings in a non-expansion portion increased in the lug part direction (top) and the non-expansion portion width slightly widened accordingly.

Figure 14:
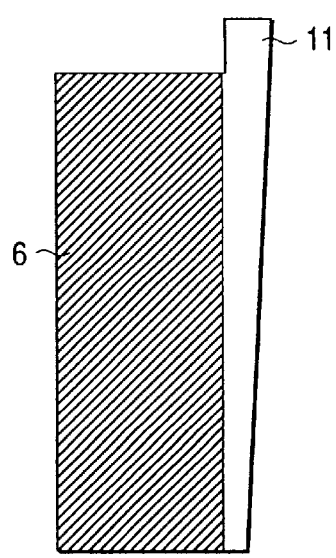
FIGS. 14 to 16 are drawings to show the outlines of large-sized expand electrode plates different in grid body shape.
Figure 15:
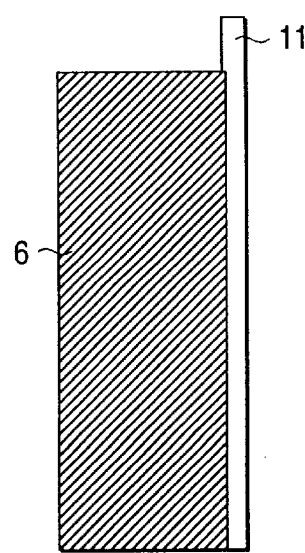
Figure 16:
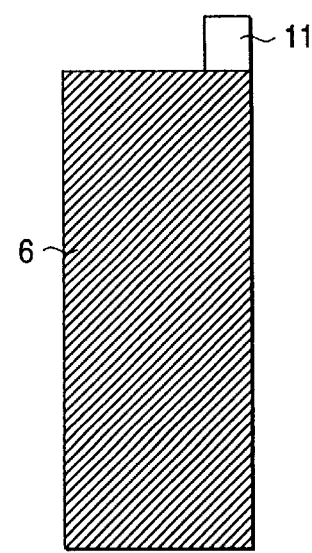

Next, pasting paper was applied to the grid bodies, a positive active material was filled so as provide a thickness of 4.0 mm, and the active material was dried only on the surface in a flash drying furnace. Subsequently, unformed positive plates were manufactured through a normal curing and drying process. Since the grid body types differ, after cutting to grid body shapes, filling was performed so as not to fill active material 6 into the lug parts 11; for the grid bodies in FIGS. 5 and 12, the active material was not filled into the non-expansion portion (FIGS. 14 and 15) and for other grid bodies, the active material 6 was filled into the full faces except the lug parts 11 (FIG. 16). Using a lead-calcium-tin alloy rolled sheet 1.1 mm thick, similar working to that of positive grid bodies was performed, whereby expanded grid bodies having the same shapes as the positive grid bodies different only in grid body thickness were manufactured, pasting paper was applied to the expanded grid bodies, and active material was filled so as to provide a thickness of 2.2 mm, then unformed negative plates were manufactured through a similar process to that of the positive plates. The positive and negative plates of the same shape were combined through a fine glass fiber separator to manufacture valve-regulated lead acid batteries of 2 V-150 Ah/10 hour rate. Table 1 lists the contents of the storage batteries.

TABLE I

Batteries used in test in First Embodiment

| Battery No. | Positive and Negative Electrode Plates and Content of Grid Bodies corresponding thereto | Remarks |
| --- | --- | --- |
| A | Expansion Direction: Width direction<br>Grid body: An openings were provided in a non-expansion portion at a predetermined distance below a lug part. (FIG. 10) | Inventive Product |
| B | Expansion Direction: Height direction (FIG. 2) | Conventional Product |
| C | Expansion Direction: Height direction<br>The upper part of a non-expansion portion was widen, and openings were formed. (FIG. 3) | Conventional Product |
| D | Expansion Direction: Height direction<br>A non-expansion portion was provided in an intermediate part of a grid body and openings were formed. (FIG. 4) | Conventional Product |
| E | Expansion Direction: Width direction<br>The width of a non-expansion portion was gradually lessened following a lug part. (FIG. 5) | Conventional Product |
| F | Expansion Direction: Width direction<br>A non-expansion portion was made small, and openings were not formed. (FIG. 12) | Conventional Product |

TABLE I-continued

Batteries used in test in First Embodiment

| Battery No. | Positive and Negative Electrode Plates and Content of Grid Bodies corresponding thereto | Remarks |
| --- | --- | --- |
| G | Expansion Direction: Width direction<br>An openings formed non-expansion portions were increased in the lug part direction (top) and a non-expansion portion width slightly widened. (FIG. 13) | Comparative Product |

A dilute sulfuric acid was poured into the storage batteries and container formation was performed, then discharge tests at some discharge rates were carried out. Table 2 lists the test results.

TABLE 2

Discharge Test Results of Each Rate

| Battery No. | $0.1C_{10}A$ (15A) Discharge Duration (h) | $1C_{10}A$ (150A) Discharge Duration (min) | $3C_{10}A$ (450A) Discharge Duration (min) | $3C_{10}A$ (450A) voltage at fifth sec. of discharge | Condition of Electrode Plate after Test |
| --- | --- | --- | --- | --- | --- |
| A | 10.37 | 33.63 | 5.58 | 1.78 | No abnormal |
| B | 10.53 | 20.62 | 1.23 | 1.56 | *1 |
| C | 10.42 | 25.67 | 3.58 | 1.64 | *1 |
| D | 10.43 | 26.22 | 1.46 | 1.58 | *1 |
| E | 9.53 | 28.85 | 5.08 | 1.76 | No abnormal |
| F | 10.25 | 32.57 | 4.68 | 1.71 | *1 |
| G | 10.33 | 33.12 | 3.93 | 1.74 | *1 |

*1: Negative grid body was melted and diminished.

Figure 17A:
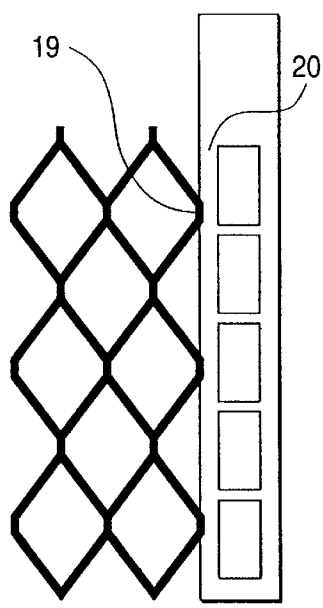
FIGS. 17A, 17B and 17C are enlarged schematic drawings to show the comparison example of the expanded grid body of the invention shown in FIG. 13.

In low-rate (0.1 $C_{10}A$) discharge, any batteries except battery E having a small active material mass showed the substantially same discharge duration. In high-rate ($1C_{10}A$, $3C_{10}A$) discharge, storage batteries A, F and G using a grid body expanded in the width direction as a positive electrode showed a longer discharge duration than storage batteries B, C and D using a grid body expanded in the electrode plate height direction. The $3C_{10}A$ discharge duration of the storage batteries F and G showing the same discharge duration to that of the battery A in the $1C_{10}A$ discharge was shorter than that of the battery A. After the test, the batteries were disassembled. The negative electrode lug part of the battery F, the mesh intersection point in contact with the upper margin of each of the batteries B, C, and D, and a part 20 (see, FIG. 17A) at the side of the opening just below the negative electrode lug part of the battery G were melted and diminished. Even in the $3C_{10}A$ discharge, the grid body of the storage battery E was not melted and diminished, but the storage battery E has a smaller active material mass than the battery A using the grid body of the invention, thus showed a small discharge capacity (discharge duration) at each rate.

Figure 17B:
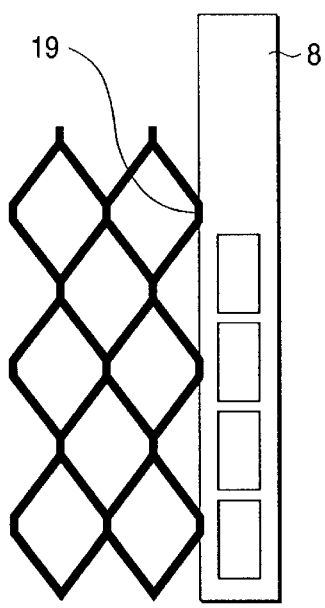
Figure 17C:
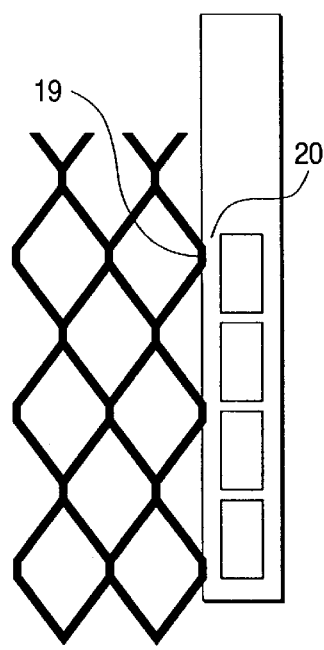

To reveal the difference between the grid body used with the battery G having the grid body melted and diminished and the grid body of the present invention, a grid body having openings shifted lower than an intersection point 19 nearest to a lug part 8 among mesh intersection points in contact with a non-expansion portion as shown in FIG. 17B, and a grid body having openings shifted exactly as the grid body in FIG. 17B and a mesh intersection point positioned at the side of the opening nearest to a lug part as shown in FIG. 17C were manufactured. These batteries were manufactured in a similar manner to that described above, and $3C_{10}A$ discharge was executed. The negative electrode grid body of the shape in FIG. 17B was not melted and diminished, but the part 20 at the side of the opening nearest to the lug part of the grid body in FIG. 17C was melted and diminished.

Considering the magnitude of current flowing per cross-sectional area of the grid body, there is a possibility that the mesh intersection point 19 nearest to the lug part may be melted and diminished. However, considering an electrical path with the lower part than the melted and diminished point, it is considered that the effect on the discharge characteristic is small particularly in a battery large in the height direction as compared with the case where the part 20 in the non-expansion portion is melted and diminished. Then, the grid body of the invention was used as a positive electrode, and the grid body of the invention (FIG. 11) wherein the intersection point 19 nearest to the lug part 8 among the mesh intersection points in contact with the non-expansion portion was previously cut and the comparison grid body (FIG. 17C) wherein the part 20 on the expansion portion side at the side of the opening nearest to the lug part was previously cut were used as negative electrodes to manufacture two types of batteries, and $1C_{10}A$ discharge test was carried out. Table 3 lists discharge duration. The test result indicates that if the mesh intersection point 19 near to the lug part is melted and diminished in high-rate discharge, discharge performance is less degraded if the grid body of the invention is used.

TABLE 3

$1C_{10}A$ discharge test result

| | Battery using negative electrode with previously cut part 19 of grid body of the invention (FIG. 11) cut | Battery using negative electrode with previously cut part 20 of comparison grid body (FIG. 17C) cut |
|---|---|---|
| Discharge duration (min) | 27.33 | 19.83 |

To cut grid bodies consecutively from an expanded sheet to form lug parts, the position of the mesh intersection point 19 nearest to the lug part changes depending on the cut position of the upper end of the expansion portion as in FIGS. 17B and 17C. Thus, to prevent the grid body from being melted and diminished in high-rage discharge, it is desirable that an opening does not exist at the side of mesh intersection point nearest to the lug part. For this purpose, it is advisable to place no openings at least within the mesh major axis dimension 18 from the upper end of the expansion portion.

Thus, it was found that the storage battery A using the grid body of the present invention has excellent discharge performance at both low rate and high rate.

Figure 18:
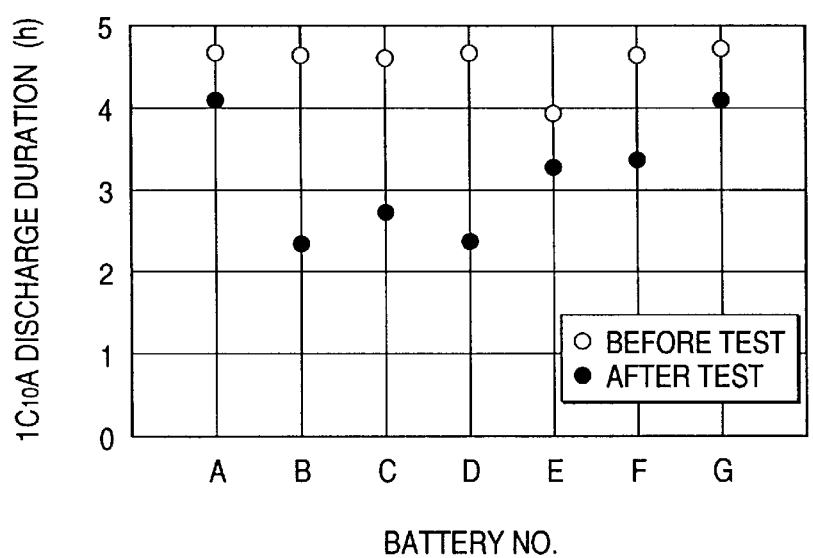
FIG. 18 shows comparison of $0.2C_{10}A$ discharge duration of different types of batteries before and after overcharge test.
Figure 19:
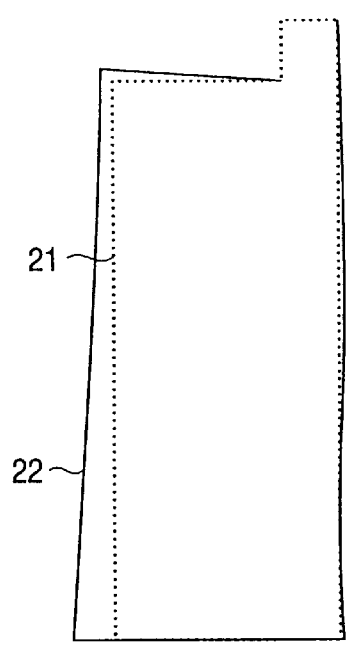
FIG. 19 is a drawing to show the outline of a positive plate of batteries A and G before and after overcharge test.
Figure 20:
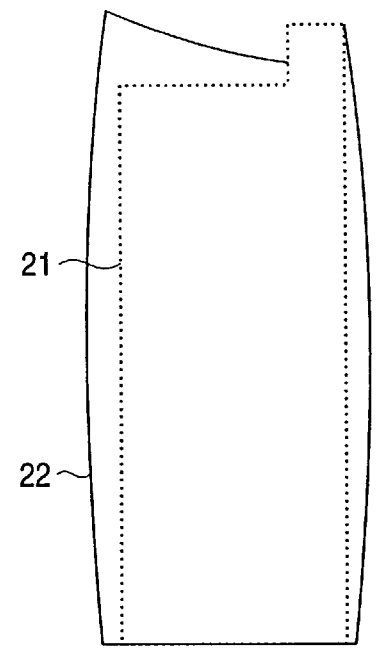
FIG. 20 is a drawing to show the outline of a positive plate of batteries B, C and D before and after overcharge test.
Figure 21:
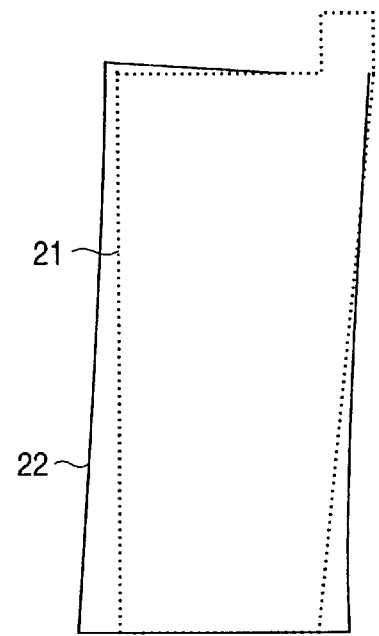
FIG. 21 is a drawing to show the outline of a positive plate of battery E before and after overcharge test.
Figure 22:
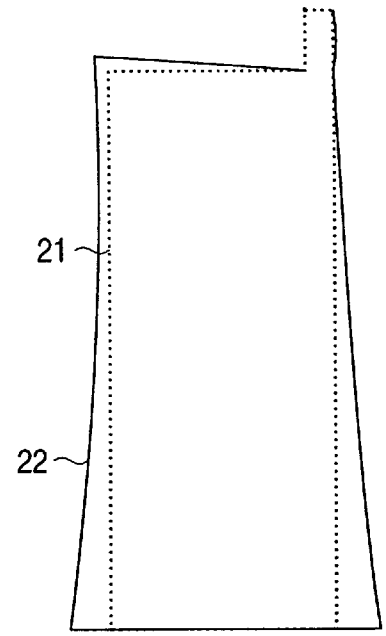
FIG. 22 is a drawing to show the outline of a positive plate of battery F before and after overcharge test.

Batteries (A to G) provided aside from the above-described each discharge rate test were subjected to $0.2C_{10}A$ discharge test, then $0.1C_{10}A$ constant-current overcharge test was carried out. The overcharge test was carried out at test temperature 60° C. for 60 days, then $0.2C_{10}A$ discharge test was carried out. Subsequently, the storage batteries were disassembled and the corrosion state of each positive electrode grid body was examined. FIG. 18 shows the capacity test results before and after the overcharge test and FIGS. 19 to 22 show the outlines of the positive plates. FIG. 19 is a drawing to show the outline of a positive plate of batteries A and G before and after overcharge test. FIG. 20 is a drawing to show the outline of a positive plate of batteries B, C and D before and after overcharge test. FIG. 21 is a drawing to show the outline of a positive plate of battery E before and after overcharge test. FIG. 22 is a drawing to show the outline of a positive plate of battery F before and after overcharge test.

The capacities of the batteries B, C, and D after the overcharge test lowered large and the capacity of the battery F lowered large next to those of the batteries B, C, and D. The capacities of the batteries A, E and G lowered small as compared with those before the overcharge test; the capacities of the storage batteries A and G each having a large amount of active material mass were also larger than the battery E after the test. As shown in FIGS. 19 to 22, comparing positive plate outlines 21 before the overcharge test with outlines 22 after the test, the deformation degree of the positive plate of each of the storage batteries B, C, D and F (FIGS. 20 and 22) is larger than that of each of the storage batteries A, E and G (FIGS. 19 and 21) and it is considered that the deformation degree is involved in capacity lowering. That is, it is considered that the capacity is maintained because the positive plate becomes less deformed if the grid body of the invention is used as the positive plate.

Therefore, it was found that the grid body of the invention is a grid body excellent in both discharge performance and life performance.

Figure 24:
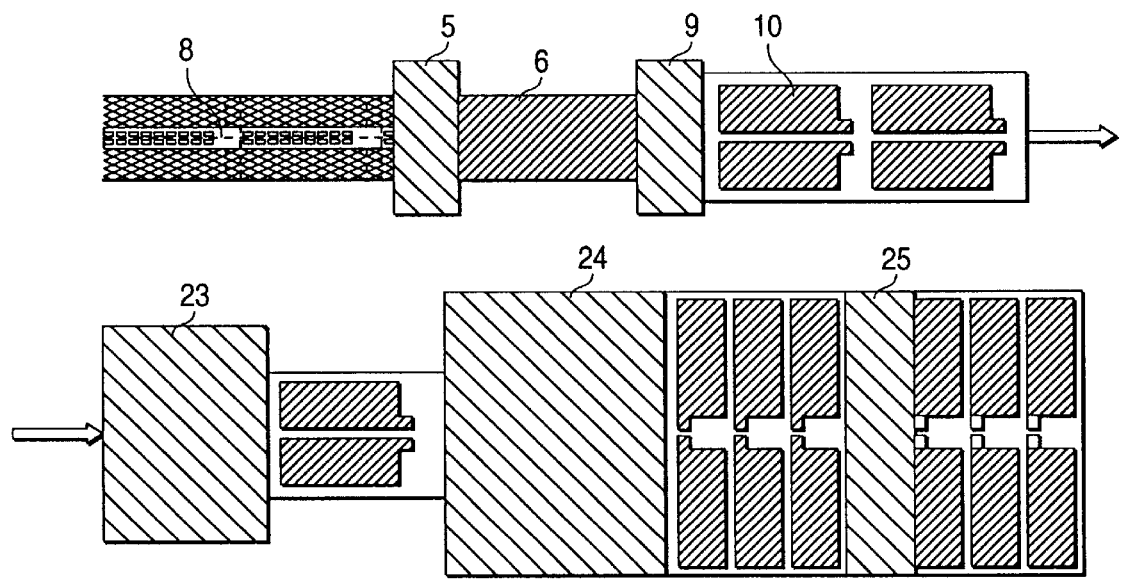
FIG. 24 is a schematic drawing to show an example of a manufacturing method of an electrode plate using the grid body of the invention.

Second embodiment:

In the first embodiment, it was found that the grid body of the invention has excellent discharge performance and life performance. An example of a method of actually manufacturing electrode plates consecutively will be discussed. FIG. 24 shows a sequence of steps.

Figure 23:
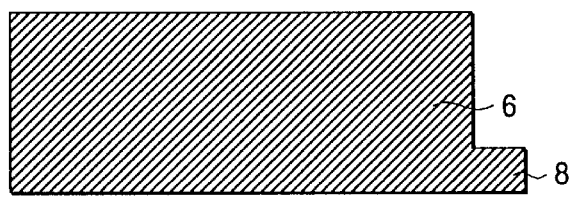
FIG. 23 is a schematic drawing to show an electrode plate using the grid body of the invention subjected to pasting the active material and cutting steps.

To manufacture the expanded electrode plate shown in FIG. 10, a lead-calcium-tin alloy rolled sheet 2 mm thick and 130 mm wide was expanded to both sides with a non-expansion portion left in the center by a reciprocation-type expanding machine. Next, openings were stamped to provide the shape shown in FIG. 9. If the expanded sheet is cut in the length direction, electrode plates can be taken out two at a time; paraffin as a parting agent of an active material was applied only to a part 8' corresponding to electrode plate lug part of one series of electrode plates. The sheet was passed through a pasting machine 5 for filling active material paste 6 into the full face of the sheet. At the pasting process, pasting paper was applied to the rear and surface of the expanded sheet and roll press was performed for bringing the pasting paper into intimate contact with the active material. After the pasting, the expanded sheet was cut to predetermined dimensions to form the state shown in FIG. 23. The electrode plate dimensions were 140 mm wide, 400 mm high, 15 mm in lug part width, and 30 mm in lug part height. The cut electrode plate was passed through a flash drying furnace 23 (FIG. 24) and was dried at 200° C. for one minute, whereby only the surface of the electrode plate was dried. After the electrode plate was passed through the flash drying furnace, the lug part of the electrode plate was parallel to the travel direction. Then, the electrode plate whose surface was dried was rotated 90 degrees by a rotating machine 24, making the electrode plate lug part perpendicular to the travel direction of the electrode plate. Subsequently, the lug part was ground by a rotating brush (grinding machine 25) for removing the deposited active material. The grinding time of the lug part by the grinding machine was changed for testing. The active material on an electrode plate lug part 8' to which paraffin was applied before pasting can be completely removed in about a third the time required for removing the active material on an electrode plate lug part 8 to which no treatment was applied, and a metal shine was observed. In addition to paraffin, grease and Vaseline were also used for testing, and similar results were provided. Before pasting, a parting agent is thus applied to the lug part, whereby the active material removal time can be shortened and the risk of thinning the lug part by grinding it can be lessened.

The purpose of rotating the electrode plate 90 degrees before passing it through the grinding machine 25 is to align the electrode plate lug parts relative to the grinding machine and grind only the lug parts consecutively so that the active material in other portions is not removed. In doing so, the active material on the lug parts can be removed easily and completely.

Figure 25:
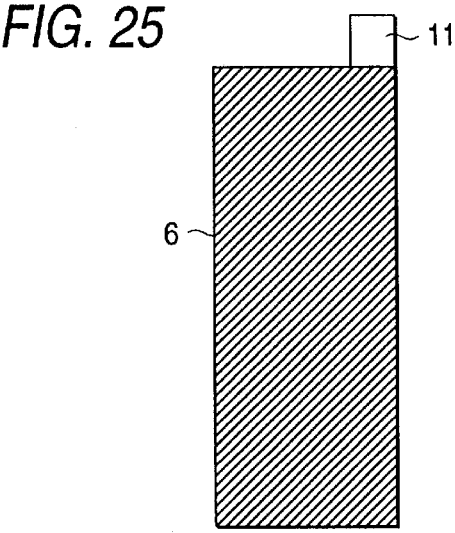
FIG. 25 is a schematic drawing to show the electrode plate of the invention after a lug part is ground.

FIG. 25 shows a state in which the active material on the lug part was removed. Then, the electrode plate was cured at 50° C. for two days. The post-cured electrode plate and a separator were combined to assemble a 2V-1000Ah battery by a normal method. At the assembling process, lug part weldability did not introduce a problem and workability similar to that of conventional articles was observed.

Third embodiment:

In the sequence of the electrode plate manufacturing steps described in the second embodiment, the timing of removing the active material on the electrode plate lug part using the grid body of the invention was studied. The active material removal timings listed below are possible and thus an experiment was conducted at the timings. Before an active material was pasted into an expansion sheet, paraffin was applied to the part which becomes a lug part as a parting agent.

1) Just after filling, 2) after passing through flash drying furnace, 3) after completion of curing, and 4) just before assembling.

The results are as follows:

1) Just after pasting: The active material was soft, a rotating brush of a grinding machine was clogged with the active material, and it became hard to remove the active material with time.

2) After passing through flash drying furnace: The active material became hard as compared with that just after pasting, and can be easily removed without being caught in the rotating brush of the grinding machine.

3) After completion of curing: The active material was hard and it took about twice the time in removing the active material; in addition, unintended parts other than the lug part also peeled off together.

4) Just before assembling: Similar result to that in 3) after completion of curing.

From the results, it was found that the appropriate timing of removing the active material on the electrode plate lug part is before curing after passing through flash drying furnace in which only the surface of the electrode plate is dried.

Figure 26:
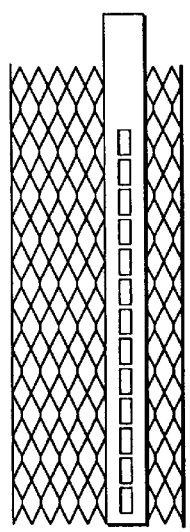
FIG. 26 is a drawing to show an example of the grid body of the invention.

In the description of the embodiments, the lug part placed in the margin of the grid body is taken as an example. However, it was found that the discharge performance of a battery using a grid body comprising an expansion portion on both sides of a non-expansion portion formed with a lug part and openings (FIG. 26) is further enhanced (for example, $1C_{10}A$ discharge duration is increased about 10%) although the grid body can be taken out only one at a time when an expanded sheet is cut in the length direction to provide grid bodies.

As described throughout the specification, to use an expanded grid body for a lead-acid battery, particularly for a large-sized battery using an electrode plate having a large height dimension, the invention provides an expanded grid body excellent in productivity, voltage characteristic, and life characteristic and a method of efficiently manufacturing an electrode plate from the grid body.

What is claimed is:

1. A lead-acid battery electrode plate manufactured by a process comprising the steps of:

(1) consecutively supplying a lead or lead alloy sheet;

(2) leaving a part in the vicinity of the center of the sheet as a non-expansion portion and expanding both sides like mesh to form a grid body;

(3) filling active material paste into the grid body; and (4) cutting the grid body to predetermined dimensions;

wherein the non-expansion portion forms a current collector part of the electrode plate along an expansion portion in an up and down direction of the electrode plate;

one or more openings are made in a part of the non-expansion portion; a part of the non-expansion portion is projected above a position of an upper margin of the cut expansion portion as a current collector lug part so that the expansion direction is a width direction of the electrode plate.

2. The lead-acid battery electrode plate as claimed in claim 1, wherein openings are not made in the current collector lug part or the non-expansion portion in a given portion downward from the position of the upper margin of the cut expansion portion, and the dimensions of the given portion are equal to or greater than a mesh major axis dimension of the expansion section.

* * * * *